United States Patent
Nishimori et al.

(10) Patent No.: US 9,250,504 B2
(45) Date of Patent: Feb. 2, 2016

(54) LIGHT SOURCE UNIT AND IMAGE PROJECTION APPARATUS INCLUDING LIGHT SOURCE UNIT

(71) Applicants: Takehiro Nishimori, Kanagawa (JP); Kazuhiro Fujita, Tokyo (JP); Toshiharu Murai, Kanagawa (JP); Ikuo Maeda, Kanagawa (JP); Tatsuya Takahashi, Tokyo (JP)

(72) Inventors: Takehiro Nishimori, Kanagawa (JP); Kazuhiro Fujita, Tokyo (JP); Toshiharu Murai, Kanagawa (JP); Ikuo Maeda, Kanagawa (JP); Tatsuya Takahashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 83 days.

(21) Appl. No.: 14/153,196

(22) Filed: Jan. 13, 2014

(65) Prior Publication Data
US 2014/0240679 A1     Aug. 28, 2014

(30) Foreign Application Priority Data
Feb. 26, 2013   (JP) ................... 2013-035400

(51) Int. Cl.
*G03B 21/16* (2006.01)
*F21V 29/02* (2006.01)
*G03B 21/20* (2006.01)

(52) U.S. Cl.
CPC .............. *G03B 21/16* (2013.01); *F21V 29/02* (2013.01); *G03B 21/208* (2013.01); *G03B 21/2013* (2013.01); *G03B 21/2033* (2013.01)

(58) Field of Classification Search
CPC .. G03B 21/2033; G03B 21/00; H04N 9/3164; H04N 9/3144
See application file for complete search history.

(56) References Cited

U.S. PATENT DOCUMENTS

| | | | |
|---|---|---|---|
| 8,123,381 B1* | 2/2012 | Wray | 362/294 |
| 2006/0065125 A1* | 3/2006 | Horiguchi et al. | 96/419 |
| 2008/0170015 A1 | 7/2008 | Kise et al. | |
| 2010/0244700 A1* | 9/2010 | Chong et al. | 315/113 |
| 2011/0096296 A1 | 4/2011 | Ogawa | |
| 2011/0188001 A1* | 8/2011 | Fang et al. | 353/33 |
| 2012/0313980 A1 | 12/2012 | Kjaer et al. | |

(Continued)

FOREIGN PATENT DOCUMENTS

| | | |
|---|---|---|
| CN | 102053467 A | 5/2011 |
| CN | 102686941 A | 9/2012 |
| CN | 102841494 A | 12/2012 |

(Continued)

OTHER PUBLICATIONS

European Search Report dated Aug. 1, 2014 issued in corresponding European Application No. 14151321.8.

(Continued)

*Primary Examiner* — Sultan Chowdhury
*Assistant Examiner* — Danell L Owens
(74) *Attorney, Agent, or Firm* — Harness, Dickey & Pierce, P.L.C.

(57) ABSTRACT

A light source unit includes a light emitting element supporter to support a plurality of light emitting elements disposed with a dispersed pattern in a two-dimensional direction as a light emitting element assembly, and light emitted from the light emitting element assembly exits to a target. The light emitting element supporter includes a ventilating hole at an inner portion of two dimensional direction of the light emitting element assembly, and cooling air, supplied from a rear side of a light emitting side of the light emitting element assembly, passes through the ventilating hole to the light emitting side of the light emitting element assembly.

8 Claims, 14 Drawing Sheets

(56) References Cited

U.S. PATENT DOCUMENTS

2012/0320355 A1    12/2012    Maeda
2013/0308104 A1    11/2013    Nishimori et al.

FOREIGN PATENT DOCUMENTS

| | | |
|---|---|---|
| EP | 1413919 A1 | 4/2004 |
| EP | 2538274 A1 | 12/2012 |
| JP | 2002-153423 | 5/2002 |
| JP | 2005-091061 | 4/2005 |
| JP | 2008-034640 | 2/2008 |
| JP | 2009-199980 | 9/2009 |
| JP | 2011-158527 | 8/2011 |
| JP | 2011-197593 | 10/2011 |
| WO | WO-2006/027621 A2 | 3/2006 |
| WO | WO-2011/076219 A1 | 6/2011 |

OTHER PUBLICATIONS

Chinese Office Action dated Jun. 3, 2015 for corresponding Chinese Application No. 201410066651.0.

\* cited by examiner

LIGHT SOURCE UNIT AND IMAGE PROJECTION APPARATUS INCLUDING LIGHT SOURCE UNIT

This application claims priority pursuant to 35 U.S.C. §119 to Japanese Patent Application No. 2013-035400, filed on Feb. 26, 2013 in the Japan Patent Office, the disclosures of which is incorporated by reference herein in their entirety.

BACKGROUND

1. Technical Field

The present invention relates to a light source unit and image projection apparatus to emit light to a target.

2. Background Art

Screen images of personal computers, video images, and image data stored in memory cards can be transmitted to image projection apparatuses known as projectors that can project images onto a screen. In the projector, light emitted from a light source is focused on a micro mirror display device known as a digital micro mirror device (DMD), or a liquid crystal plate, to form images, which are then displayed as projection images such as color images on the screen.

In the projector, a high intensity discharge lamp has been conventionally used as the light source, but other light sources are recently developed. For example, semiconductor elements such as a light emitting diode (LED), a laser diode (LD), or organic electroluminescence (OEL) have been developed as the light source. The laser diode can be used as the light source for the image projection apparatuses to enhance, for example, color reproduction performance, light emission efficiency, and light use efficiency. Further, because the laser diode is a point light source or projects parallel beams, a lighting system can be designed easily, color lights can be synthesized using a simple configuration, and a projection lens having a small numerical aperture (NA) can be used.

When the light emitting element such as the laser diode (LD) is employed as the light source for the image projection apparatuses, light quantity of one single light emitting element is not enough for light quantity required for the image projection apparatuses.

In view of such issue, a semiconductor light source apparatus of JP-2011-197593-A is devised, in which a number of light emitting elements are packed two dimensionally on a plane, and light quantity required for an image projection apparatus can be obtained by adding light quantity of the number of light emitting elements. In this semiconductor light source apparatus, a number of light emitting elements are supported by a light emitting element supporter in a matrix pattern while setting the light axis of each of semiconductor light emitting elements to be substantially parallel to each other. Light emitted from the semiconductor light emitting elements are condensed by using a collimator lens retained at a lens holder of each of the semiconductor light emitting elements to obtain light quantity required for the image projection apparatus.

As for image projection apparatuses using a light emitting element assembly arranging a number of light emitting elements with a dispersed pattern on two dimensional direction as a light source, efficient cooling of the light emitting elements becomes an issue because if the cooling is not enough, light emitting quantity may not be stabilized, and lifetime of the light emitting elements becomes short.

The light emitting element assembly can be cooled by disposing a heat dissipater such as a heat sink on a rear side of a light emitting element supporter that supports the light emitting element assembly, in which air is supplied to the heat dissipater to cool the light emitting element assembly using a cooling fan.

However, cooling effect may not be enough just by cooling the rear side of the light emitting element supporter. Especially, when a large number of light emitting elements are densely disposed on a plane to achieve a small-sized light source, or when a large number of light emitting elements are used to increase light quantity, cooling effect may not be enough.

SUMMARY

In one aspect of the present invention, a light source unit is devised. The light source unit includes a light emitting element supporter to support a plurality of light emitting elements disposed with a dispersed pattern in a two-dimensional direction as a light emitting element assembly, light emitted from the light emitting element assembly exiting to a target. The light emitting element supporter includes a ventilating hole at an inner portion of two dimensional direction of the light emitting element assembly, and cooling air, supplied from a rear side of a light emitting side of the light emitting element assembly, passes through the ventilating hole to the light emitting side of the light emitting element assembly.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
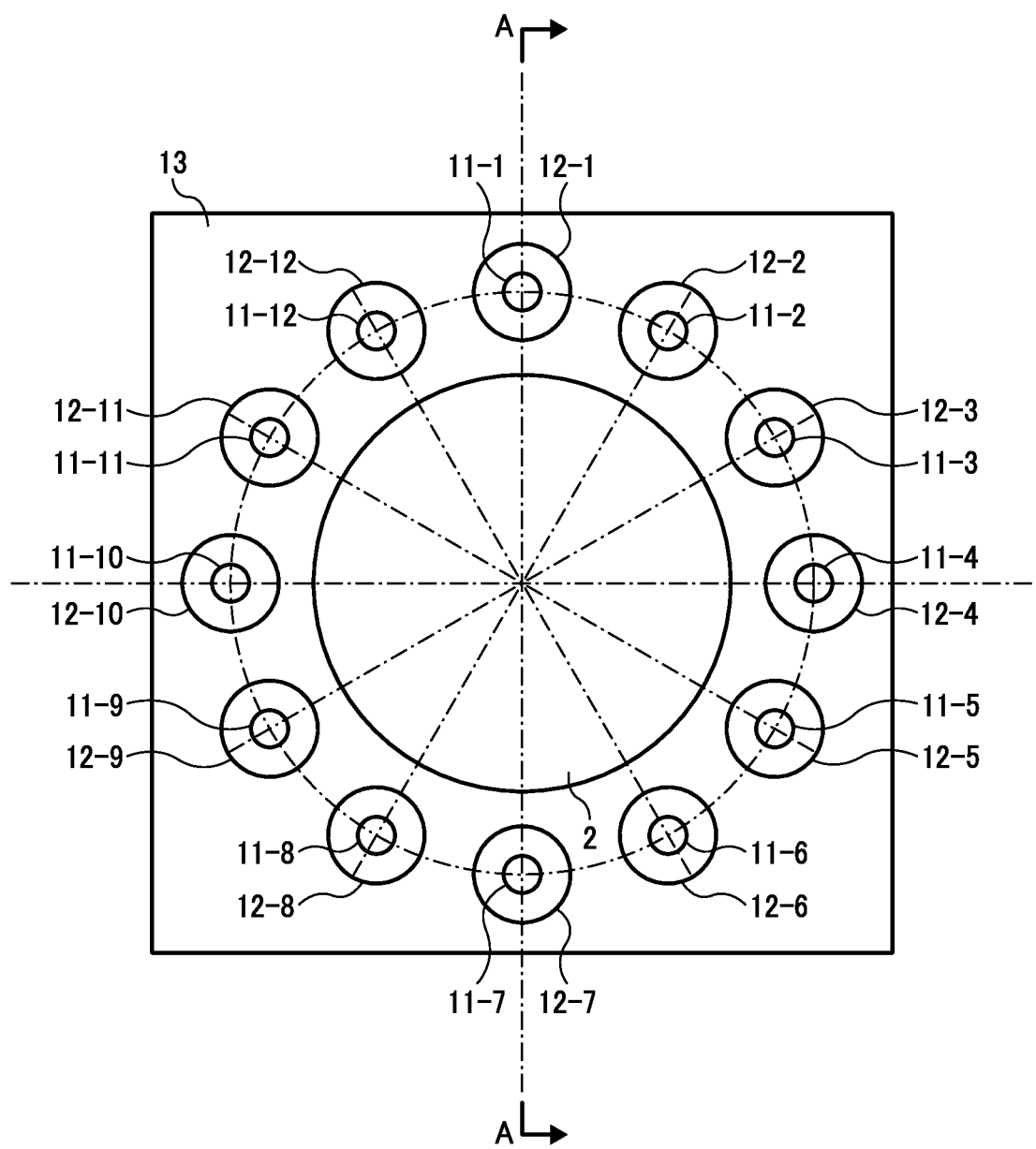
FIG. 1 is a schematic front view of a light source unit according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, apparatuses or systems according to example embodiments are described hereinafter.

First Example Embodiment

A description is given of a first example embodiment of a light source unit employable for an image projection apparatus such as a projector (hereinafter, first example embodiment). In this specification, the light source unit may be also referred to as light source apparatus.

Figure 2:
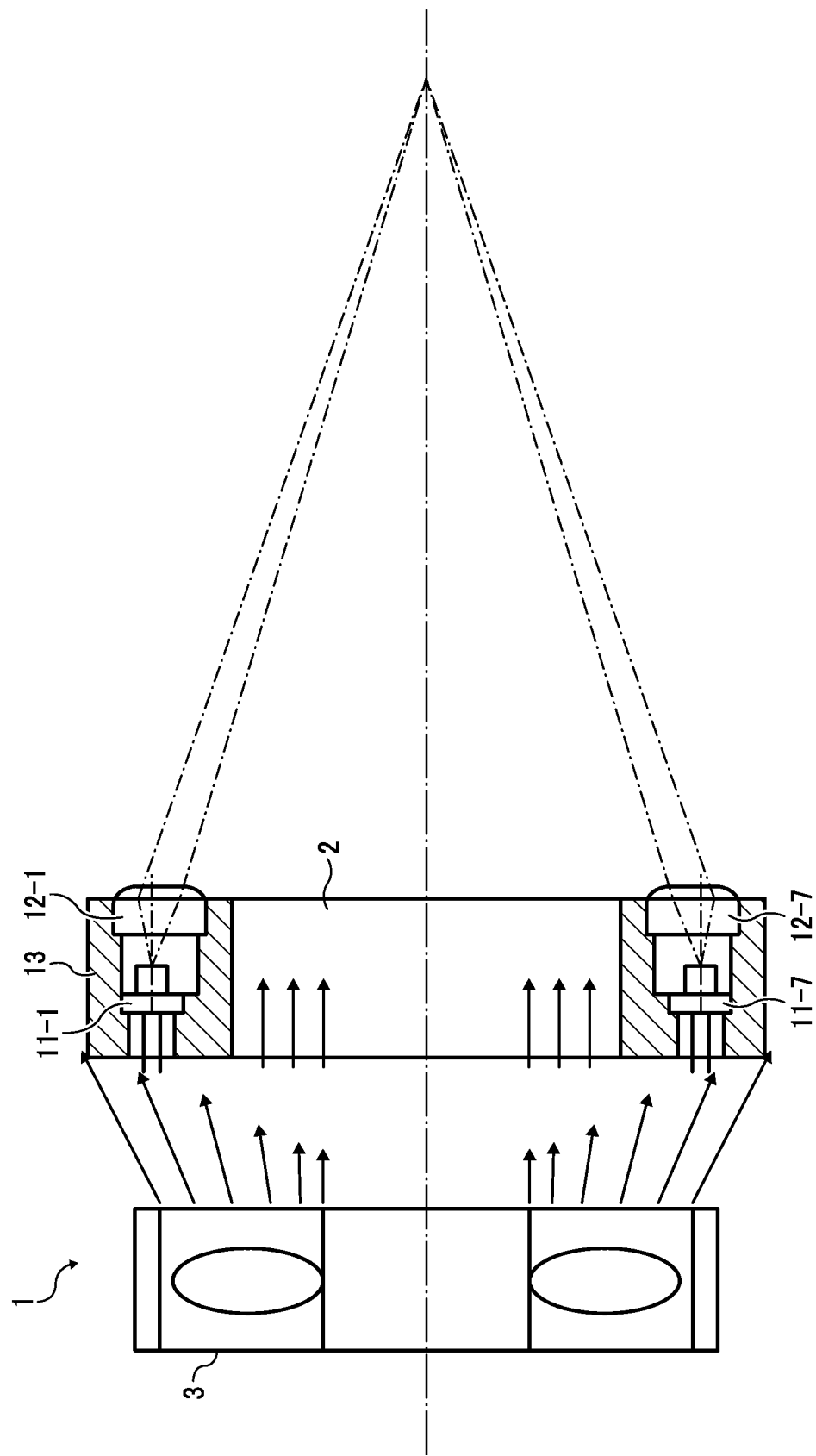
FIG. 2 is a schematic cross-sectional view of the light source unit of FIG. 1 cut at a line A-A in FIG. 1.

FIG. 1 is a schematic front view of a light source unit 1 useable as a light source unit of the first example embodiment. FIG. 2 is a schematic cross-sectional view of the light source unit 1 cut at a line A-A in FIG. 1. The light source unit 1 of the first example embodiment includes a plurality of light sources 11-1 to 11-12 (12 light sources in the first example embodiment), which is arranged into the two dimensional direction with a dispersed pattern, and the light sources 11-1 to 11-12 can be used as light source assembly or light emitting element assembly. Each of the light sources 11-1 to 11-12 is corresponded to each of coupling lenses 12-1 to 12-12, and the light sources 11-1 to 11-12 and the coupling lenses 12-1 to 12-12 are arranged in a circle pattern two dimensionally on a light source supporter 13 used as a light emitting element supporter.

Further, as shown in FIG. 2, an axial flow fan 3 used as an air supply unit can be disposed at a rear side of the light source supporter 13, which is a side opposite to a light emitting side (hereinafter, front side) of the light sources 11-1 to 11-12.

The light sources 11-1 to 11-12 are, for example, laser light sources such as semiconductor lasers, and the color of light emitted from each of the light sources 11-1 to 11-12 may be the same or different.

Figure 3:
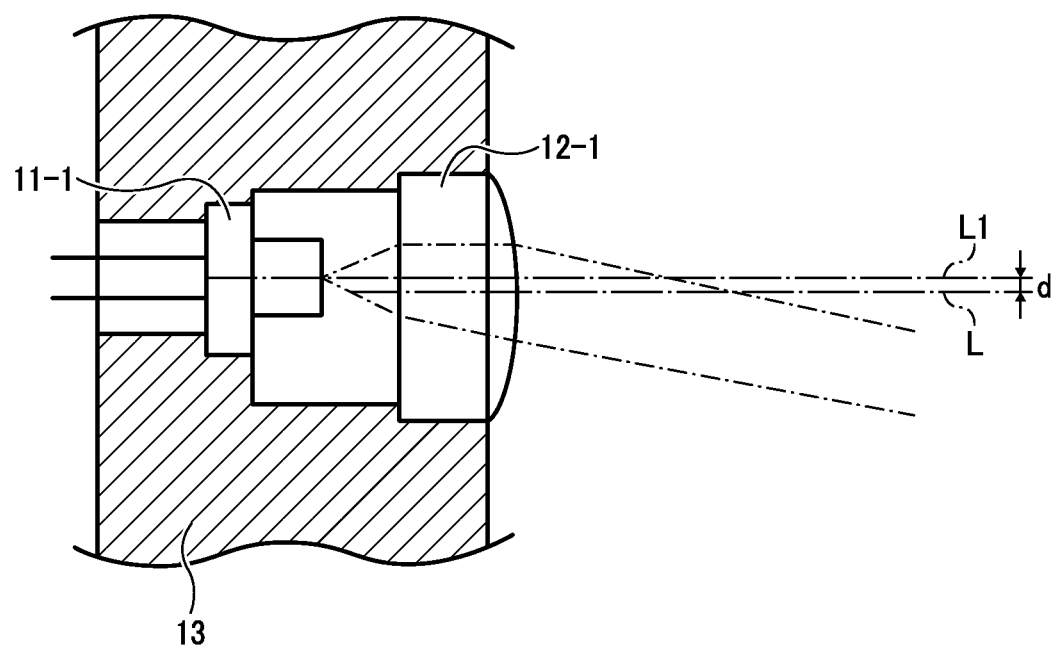
FIG. 3 shows a positional relationship of a light source and a coupling lens in the light source unit of FIG. 1.

Each of the coupling lenses 12-1 to 12-12 is, for example, a convex lens made of glass or plastic material. As shown in FIG. 3, a curvature center axis L of each of the coupling lenses 12-1 to 12-12 can be offset with respect to an optical axis L1 of each of the light sources 11-1 to 11-12 toward the inner circumferential direction so that an axis deviation "d" is set between the curvature center axis L and the optical axis L1.

By arranging the light sources 11-1 to 11-12 and the coupling lenses 12-1 to 12-12 in this configuration, light emitted from each of the light sources 11-1 to 11-12 passes through the corresponding coupling lenses 12-1 to 12-12 while a direction of the exiting light is angled toward the center of the circle ring pattern, with which the lights emitted from the light sources 11-1 to 11-12 can be formed as an exit light having a substantially cone-shaped.

The light source supporter 13 can be made of, for example, metal such as aluminum, or a mold resin. The light source supporter 13 is formed with a ventilating hole 2, which is a through hole having a circle shape at an inner portion of the light sources 11-1 to 11-12 arranged in the circle pattern two dimensionally. In the first example embodiment, among cooling air supplied from the axial flow fan 3, cooling air at an outer side of radius direction of the fan is blown to the rear side of the light source supporter 13 directly, and cooling air at an inner portion of radius direction of the fan passes through the ventilating hole 2 of the light source supporter 13.

In the first example embodiment, at the front side of the light source supporter 13, cooling air from the axial flow fan 3 can be supplied to an inner portion of the circularly-arranged light sources 11-1 to 11-12 from the rear side of the light source supporter 13. Because the cooling air supplied to the inner portion of the circularly-arranged light sources 11-1 to 11-12 has not yet taken heat from the light sources 11-1 to 11-12, the cooling air can cool the inner portion of the circularly-arranged light sources 11-1 to 11-12 efficiently.

In conventional configurations that cool the light sources 11-1 to 11-12 at the front side of the light source supporter 13 by supplying cooling air from a side face of the light source supporter 13, the cooling air passing through the inner portion of the circularly-arranged light sources 11-1 to 11-12 is already warmed by taking heat from the light sources 11-1 to 11-12. Therefore, the inner portion of the circularly-arranged light sources 11-1 to 11-12 cannot be cooled efficiently.

Compared to the conventional configurations cooling the light sources 11-1 to 11-12 by supplying cooling air from the side face of the light source supporter 13, the configuration of the first example embodiment can cool the inner portion of the circularly-arranged light sources 11-1 to 11-12 efficiently. The inner portion of the circularly-arranged light sources 11-1 to 11-12 at the front side of the light source supporter 13 becomes a warm portion with an effect of heat from the light sources 11-1 to 11-12. Therefore, removing heat at the inner portion of the circularly-arranged light sources 11-1 to 11-12 efficiently is important to enhance cooling performance at the light sources 11-1 to 11-12 on the light source supporter 13. The configuration of the first example embodiment can enhance cooling performance of the light sources 11-1 to 11-12 on the light source supporter 13.

Further, in the first example embodiment, a part of cooling air supplied by the axial flow fan 3 is blown to the rear side of the light source supporter 13. Therefore, cooling air can be supplied to both of the rear side of the light source supporter 13 and the inner portion of the circularly-arranged light sources 11-1 to 11-12 at the front side of the light source supporter 13 by using one axial flow fan 3 to cool the light sources 11-1 to 11-12.

In the first example embodiment, the size of the light source supporter 13 and the diameter of circle pattern defined by the light sources 11-1 to 11-12 can be set to any values at discretion, and the number of light sources can be set to a suitable number. Further, if heat quantity of the light source supporter 13 is set greater, heat dissipation performance can be enhanced.

Because the light source unit 1 of the first example embodiment can devise an enhanced cooling performance of the light sources 11-1 to 11-12, light emitting quantity of the light sources 11-1 to 11-12 can be stabilized and lifetime of the light sources 11-1 to 11-12 can be enhanced, and further, because the freedom of design can be broader, the light source unit 1 can be applied to various needs and applications. For example, the light source unit of the first example embodiment can be applied to an image projection apparatus such as a projector.

Second Example Embodiment

A description is given of a second example embodiment of a light source unit. A light source unit 1*a* of the second example embodiment has a configuration almost same as the light source unit 1 of the above first example embodiment, but compared to the light source unit 1 of the first example embodiment, a configuration to enhance cooling performance is added. A description is given of a different point of the light source unit 1*a* of the second example embodiment compared to the light source unit 1 of the first example embodiment.

Figure 4:
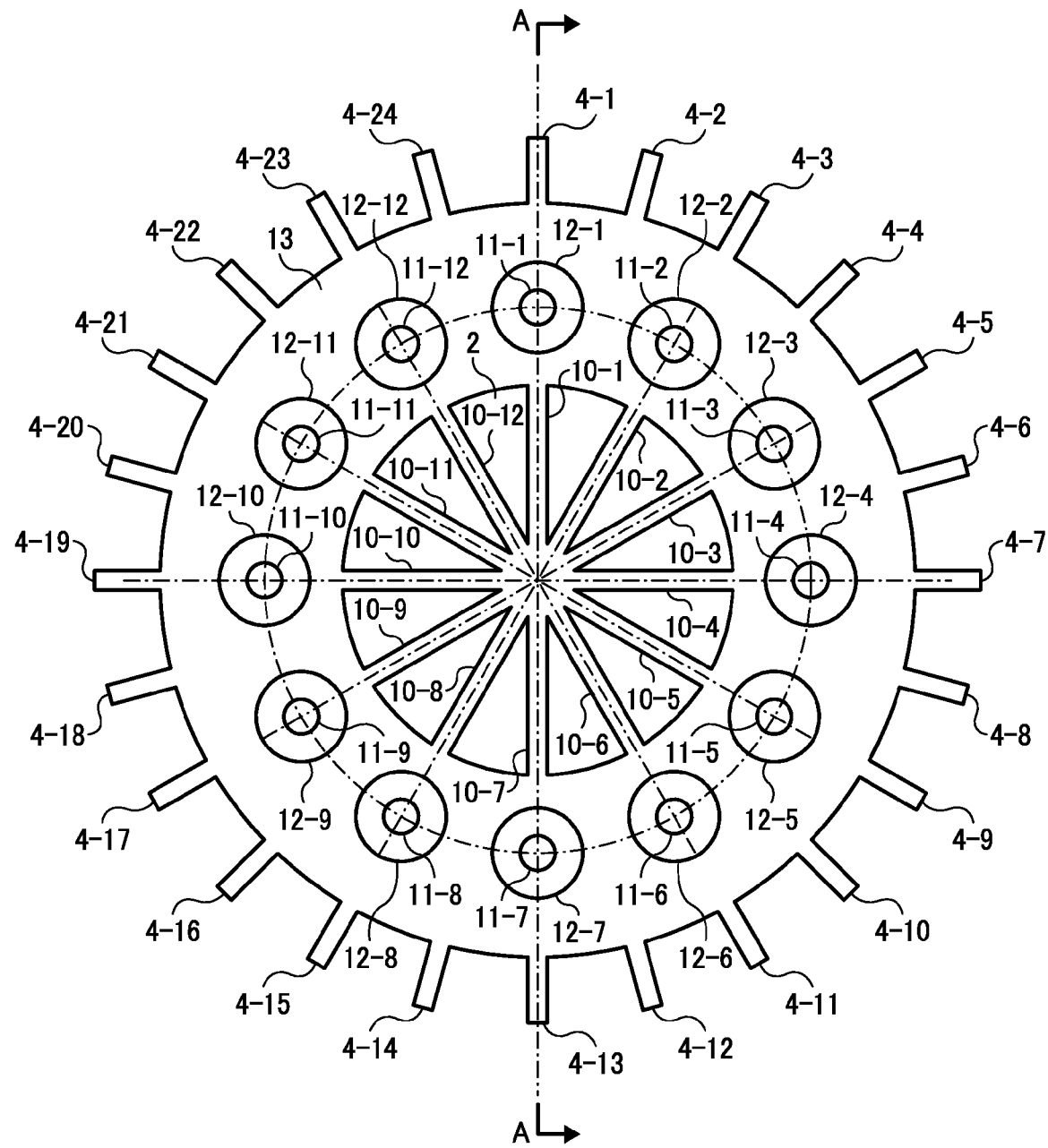
FIG. 4 is a schematic front view of a light source unit according to a second example embodiment.
Figure 5:
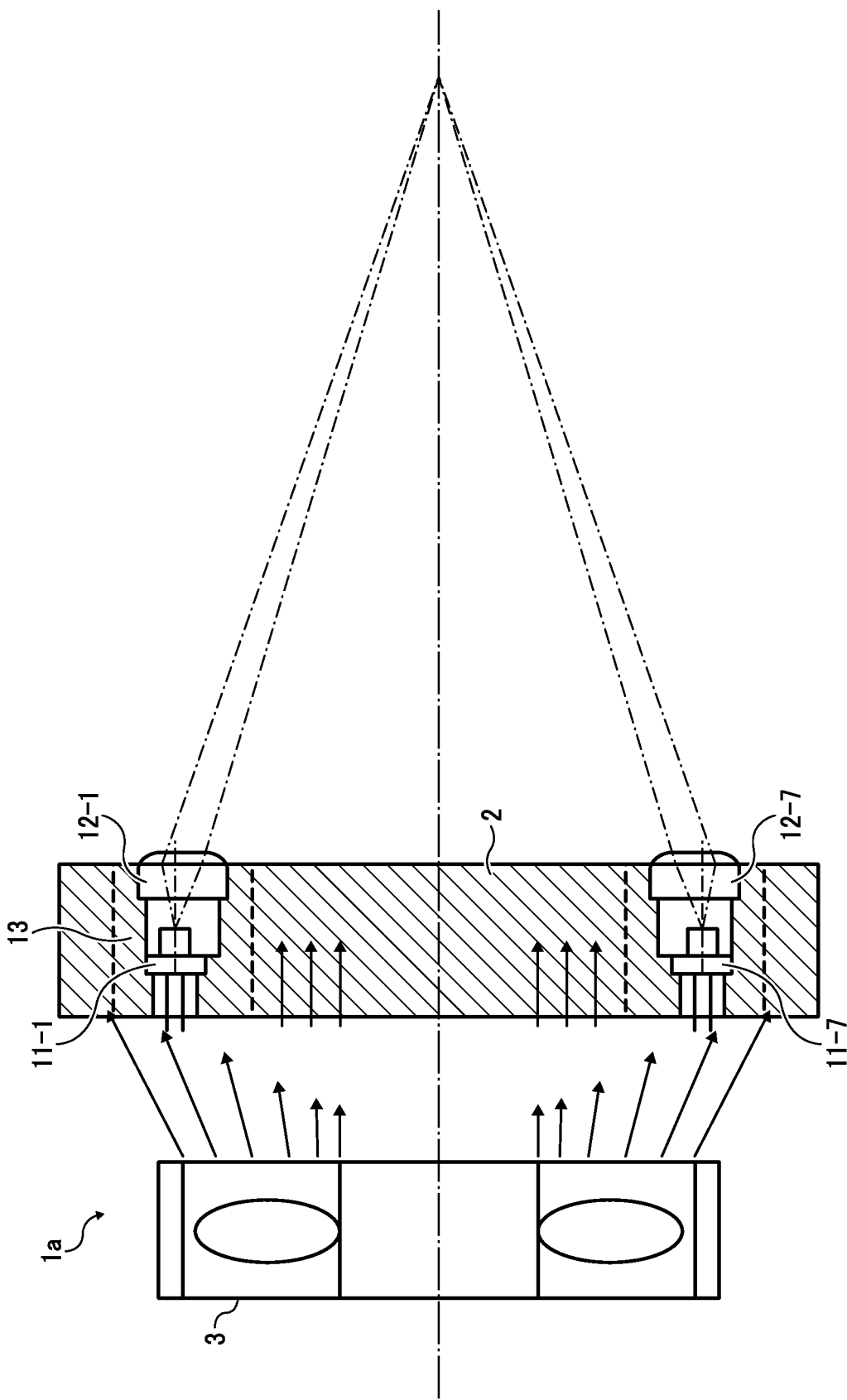
FIG. 5 is a schematic cross-sectional view of the light source unit of FIG. 4 cut at a line A-A in FIG. 4.

FIG. 4 is a schematic front view of the light source unit 1*a* useable as a light source unit of the second example embodiment. FIG. 5 is a schematic cross-sectional view of the light source unit 1*a* cut at a line A-A in FIG. 4. As shown in FIG. 4, the light source unit 1*a* of the second example embodiment includes the light source supporter 13 that supports a plurality of light sources 11-1 to 11-12 and a plurality of coupling lenses 12-1 to 12-12, wherein the light source supporter 13 has a disc-like shape. In the second example embodiment, as shown in FIG. 4, a plurality of fins 4-1 to 4-24 (24 fins in the second example embodiment) is formed on an outer periphery of the light source supporter 13, and further, a plurality of fins 10-1 to 10-12 (12 fins in the second example embodiment) is formed on an inner side wall of the ventilating hole 2 of the light source supporter 13.

By adding the fins 4-1 to 4-24 and the fins 10-1 to 10-12 to the light source supporter 13, a surface area of the light source supporter 13 can be enlarged, with which a contact area of the light source supporter 13 contactable to cooling air coming from the axial flow fan 3 can be enlarged, and heat dissipation performance of the light source supporter 13 can be enhanced. Resultantly, cooling performance of the light sources 11-1 to 11-12 on the light source supporter 13 can be enhanced, and light emitting quantity of the light source unit 1 can be stabilized and lifetime of the light source unit 1 can be enhanced.

Third Example Embodiment

A description is given of a third example embodiment of a light source unit. A light source unit 1*b* of the third example embodiment has a configuration almost same as the light source unit 1*a* of the above second example embodiment, but compared to the light source unit 1*a* of the second example embodiment, a heat dissipater such as a heat sink 15 is further disposed to enhance cooling performance. A description is given of a different point of the light source unit 1*b* of the third example embodiment compared to the light source unit 1*a* of the second example embodiment.

Figure 6:
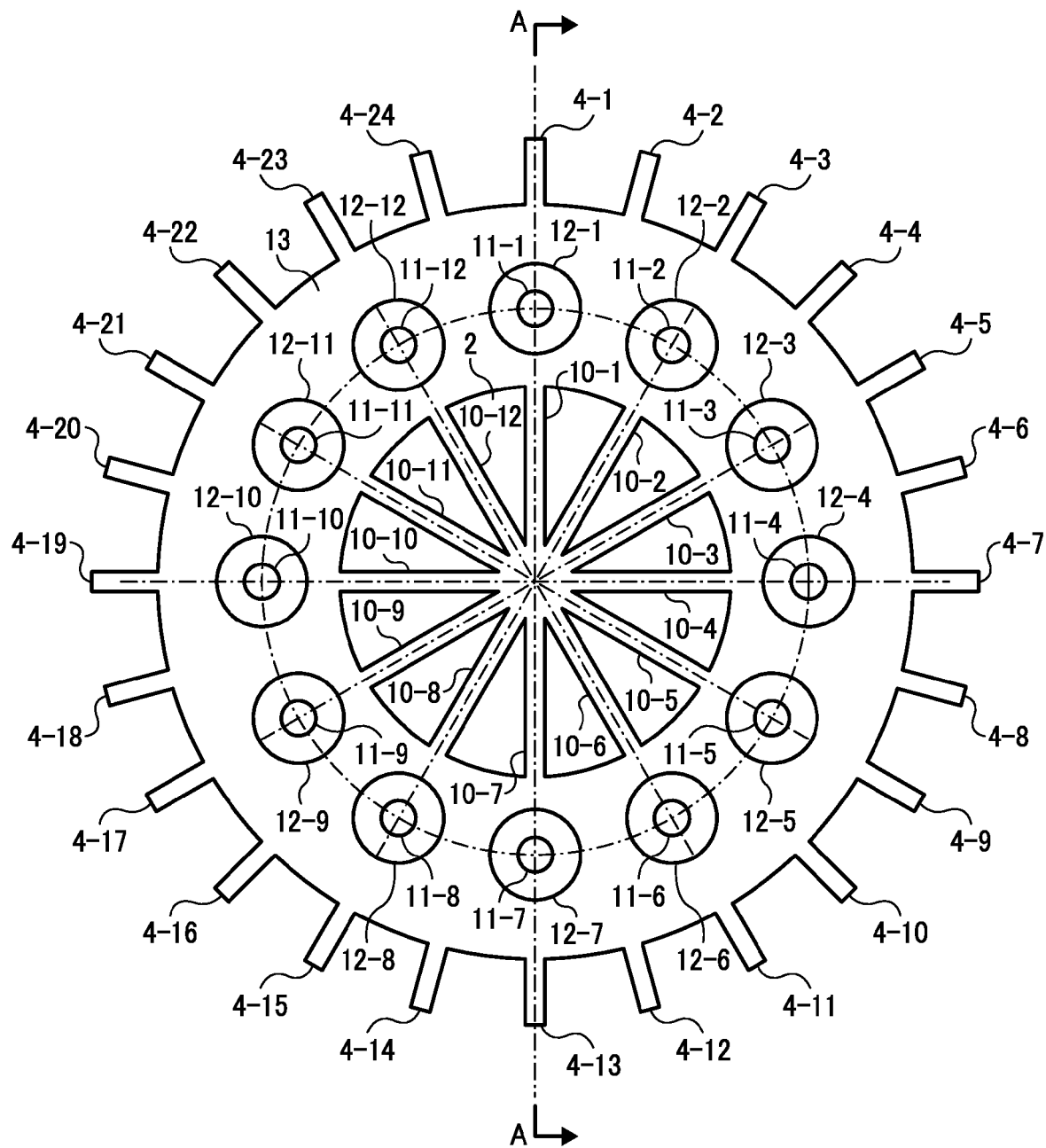
FIG. 6 is a schematic front view of a light source unit according to a third example embodiment.
Figure 7:
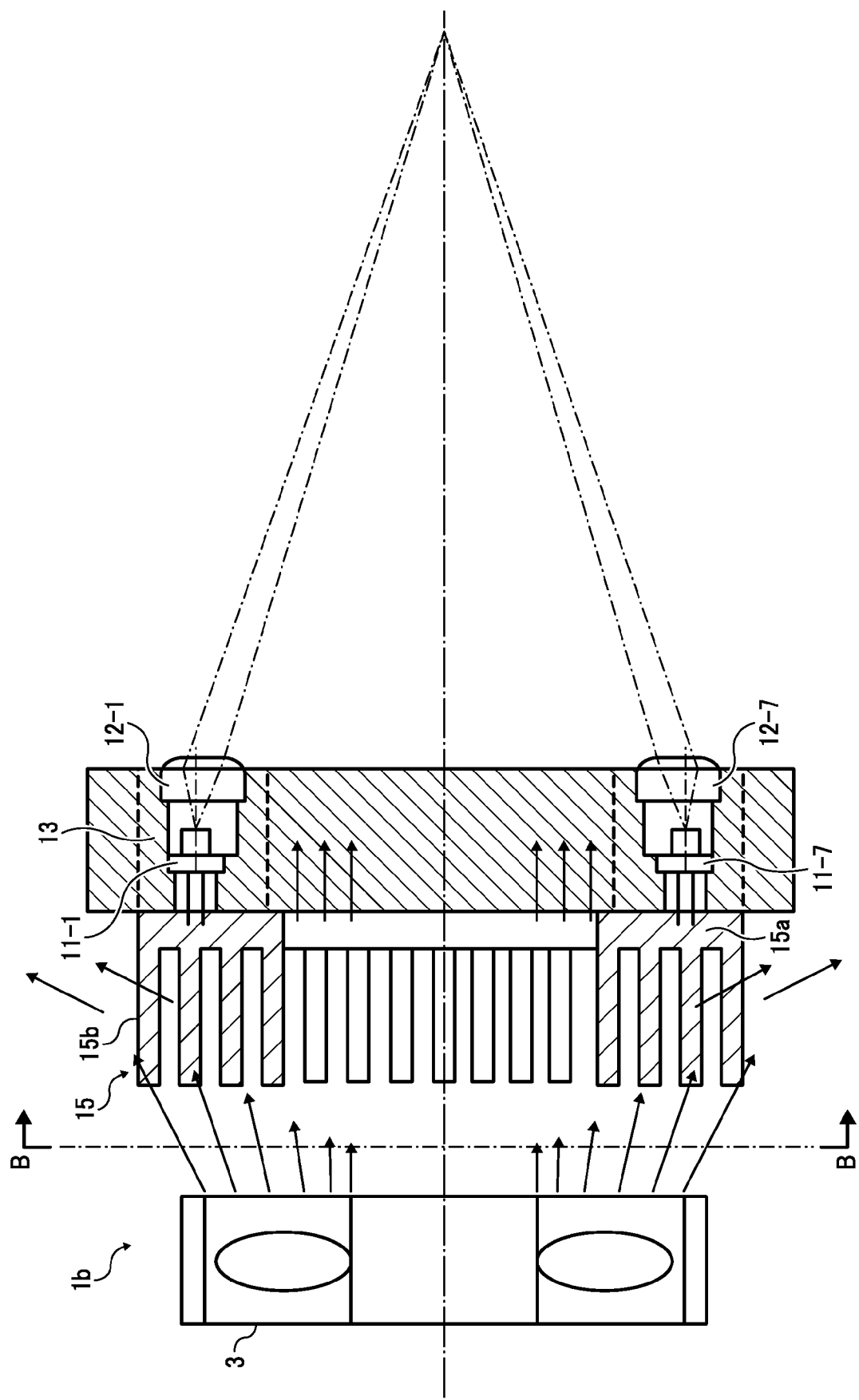
FIG. 7 is a schematic cross-sectional view of the light source unit of FIG. 6 cut at a line A-A in FIG. 6.
Figure 8:
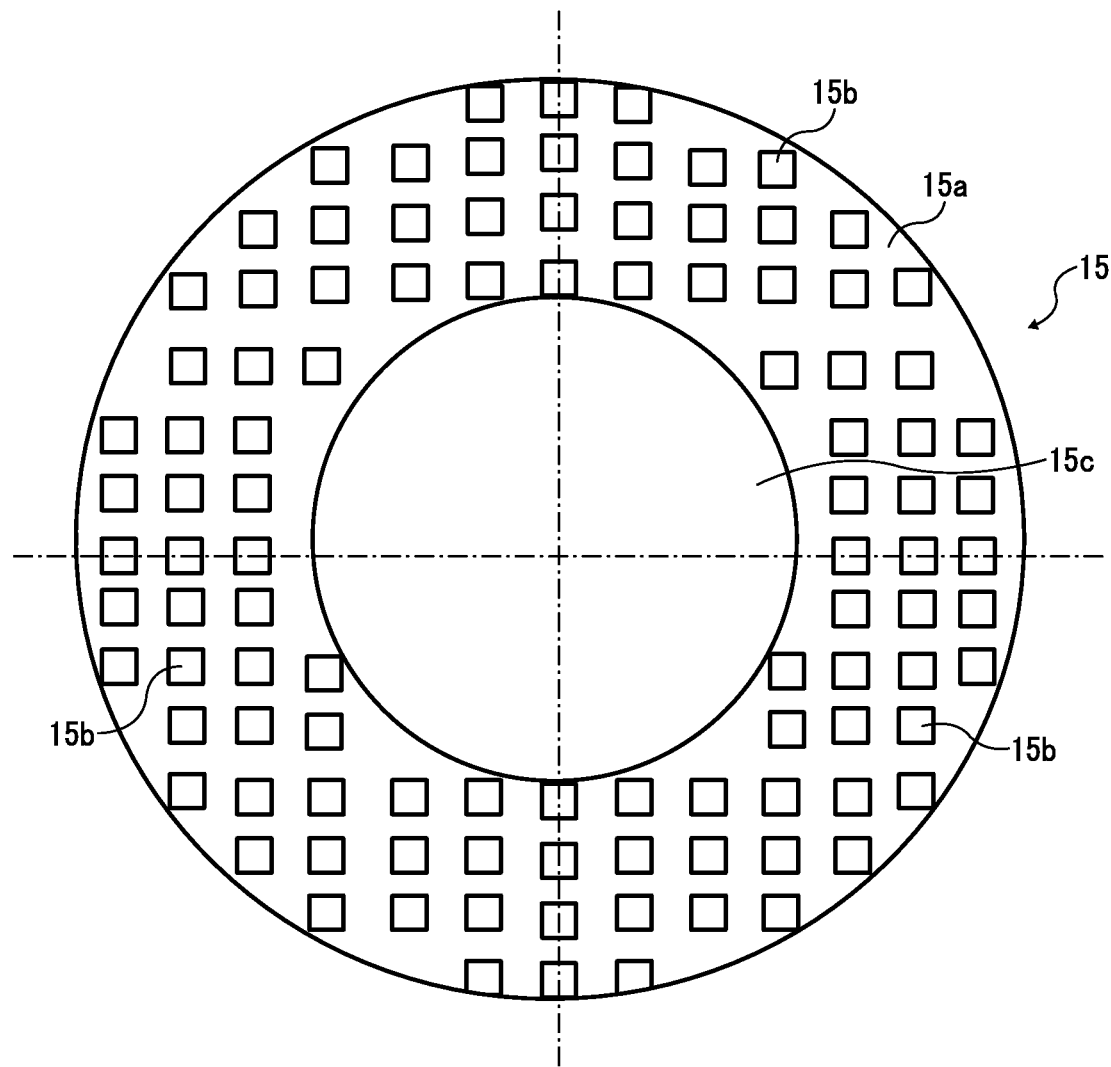
FIG. 8 is a schematic view of a heat sink of the light source unit of FIG. 6 viewed from a rear side of a light source supporter.

FIG. 6 is a schematic front view of the light source unit 1*b* useable as a light source unit of the third example embodiment. FIG. 7 is a schematic cross-sectional view of the light source unit 1*b* cut at a line A-A in FIG. 6. FIG. 8 is a schematic view of the heat sink 15 of the light source unit 1*b* viewed from a rear side of the light source supporter 13.

As for the light source unit 1*b* of the third example embodiment, as shown in FIG. 7, the heat sink 15 is attached to a rear face of the light source supporter 13. The heat sink 15 includes, for example, a base 15*a* and rod fins 15*b*. The base 15*a* is attached to the rear face of the light source supporter 13 so that the base 15*a* is closely disposed to the rear side of the light sources 11-1 to 11-12, which are arranged in a circle pattern two dimensionally at the front side of the light source supporter 13, and a number of the rod fins 15*b* extend from the base 15*a*.

In the third example embodiment, as shown in FIG. 8, the heat sink 15 is formed as a circular ring having formed with a through hole 15*c*, which is aligned to the ventilating hole 2 of the light source supporter 13. With this configuration, cooling air coming from the axial flow fan 3 can pass through the ventilating hole 2 via the through hole 15*c*.

Among the cooling air supplied by the axial flow fan 3, cooling air at an outer side of radius direction of the fan is directly blown to the heat sink 15 attached to the rear face of the light source supporter 13, and then guided to outward of radius direction of the heat sink 15 by passing through gaps between the rod fins 15*b*. With this configuration, heat transmitted from the light sources 11-1 to 11-12 on the light source supporter 13 to the heat sink 15 via the light source supporter 13 can be removed by the cooling air efficiently, with which cooling performance of the light sources 11-1 to 11-12 on the light source supporter 13 can be enhanced.

Fourth Example Embodiment

A description is given of a fourth example embodiment of a light source unit. A light source unit 1*c* of the fourth example embodiment has a configuration almost same as the light source unit 1*b* of the third example embodiment, but compared to the light source unit of the third example embodiment, a flow guide such as a flow plate 21 is disposed to further enhance cooling performance, wherein cooling air that has passed through the ventilating hole 2 is then guided to the light sources 11-1 to 11-12 by the flow plate 21. A description is given of a different point of the light source unit 1*c* of the fourth example embodiment compared to the light source unit 1*b* of the third example embodiment.

Figure 9:
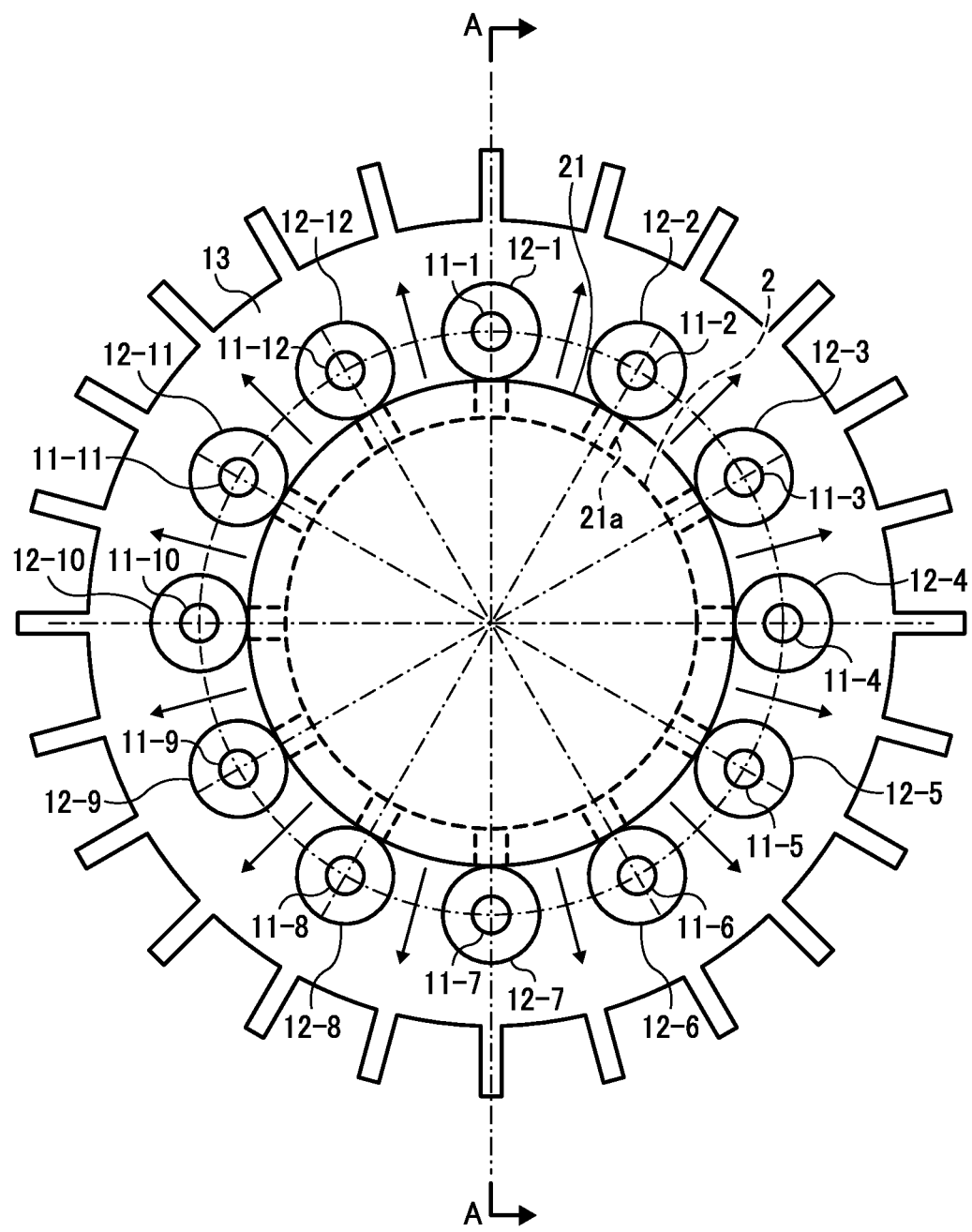
FIG. 9 is a schematic front view of a light source unit according to a fourth example embodiment.
Figure 10:
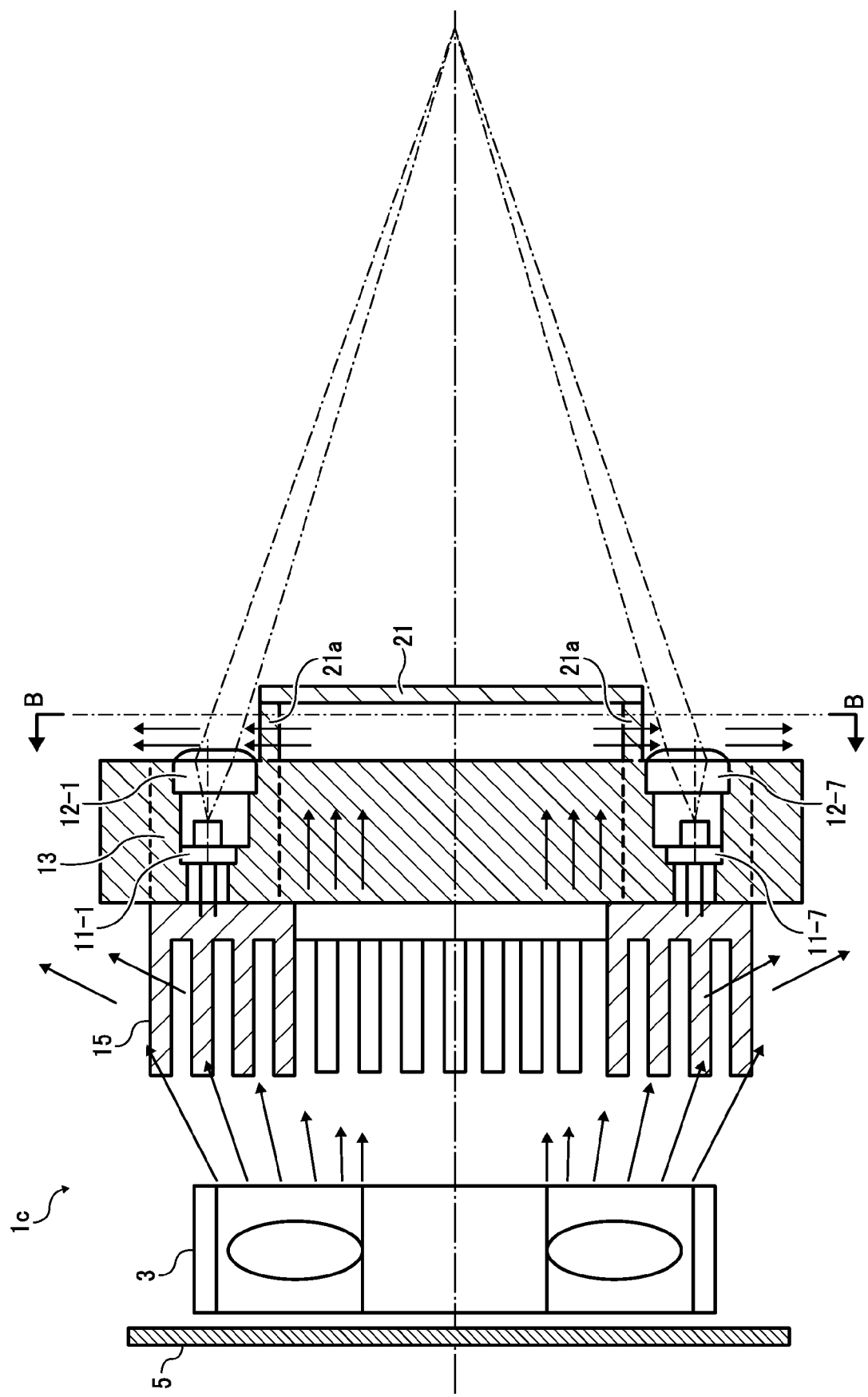
FIG. 10 is a schematic cross-sectional view of the light source unit of FIG. 9 cut at a line A-A in FIG. 9.
Figure 11:
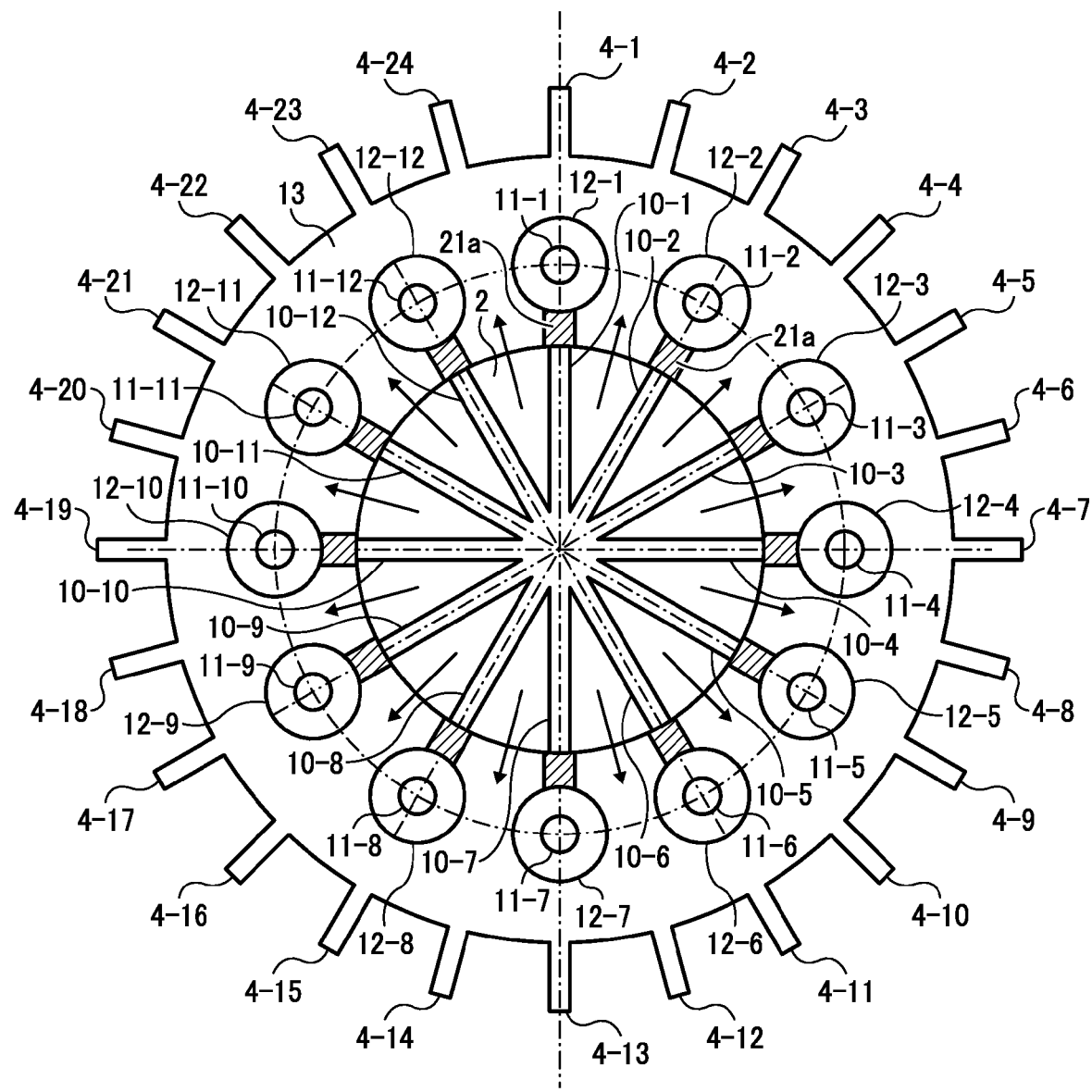
FIG. 11 is a schematic cross-sectional view of the light source unit of FIG. 10 cut at a line B-B in FIG. 10.

FIG. 9 is a schematic front view of the light source unit 1*c* useable as a light source unit of the fourth example embodiment. FIG. 10 is a schematic cross-sectional view of the light source unit 1*c* cut at a line A-A in FIG. 9. FIG. 11 is a schematic cross-sectional view of the light source unit 1*c* cut at a line B-B in FIG. 10.

As shown in FIG. 9 and FIG. 10, in the light source unit 1*c* of the fourth example embodiment, the flow plate 21 having a disc-like shape is disposed at a position facing the ventilating hole 2 at the front side of the light source supporter 13, in which the flow plate 21 is used as the flow guide to guide the cooling air that has passed through the ventilating hole 2 to the light sources 11-1 to 11-12.

As shown in FIG. 9, the flow plate 21 is substantially aligned with the ventilating hole 2, and has a diameter greater than a diameter of the ventilating hole 2. As shown in FIG. 10 and FIG. 11, the flow plate 21 is disposed at the front side of the light source supporter 13 via a plurality of spacers 21a (12 spacers in the fourth example embodiment).

In the fourth example embodiment, as indicated by arrows in FIG. 10, cooling air that has passed through the ventilating hole 2 hits a rear face of the flow plate 21, facing the ventilating hole 2, and is then guided to the outer side of radius direction of the fan along the rear face of the flow plate 21. With this configuration, cooling air that has passed through the ventilating hole 2 passes through gaps between the spacers 21a, and flows on or over the light source supporter 13 while contacting the light sources 11-1 to 11-12 disposed at the front side of the light source supporter 13, and flows to the outer side of radius direction of the fan of the light source supporter 13. By forming such flow path of cooling air, cooling air that has passed through the ventilating hole 2 can pass through a space closer to the light sources 11-1 to 11-12, and can preferably hit the light sources 11-1 to 11-12 directly. Resultantly, heat can be efficiently taken from the light sources 11-1 to 11-12 by using the cooling air that has passed through the ventilating hole 2, and cooling performance can be enhanced.

Further, in the fourth example embodiment, as shown in FIG. 10, a dust-proof filter 5 is disposed at an air intake side of the axial flow fan 3 to remove foreign particles such as dust or the like from air before intaking air by the axial flow fan 3. By disposing the dust-proof filter 5, dust adhesion to the coupling lenses 12-1 to 12-12 can be suppressed, in particular prevented, and problems such as decrease of light quantity can be suppressed, in particular prevented. Further, the dust-proof filter 5 can be disposed at an air discharge side of the axial flow fan 3 such as at a space between the axial flow fan 3 and the heat sink 15. Further, the dust-proof filter 5 can be disposed at an internal position, an entry side, and an exit side of the through hole 15c of the heat sink 15, and at an internal position, an entry side, and an exit side of the ventilating hole 2. Further, the dust-proof filter 5 can be used with for the light source units of the above described example embodiment and the following example embodiment.

Fifth Example Embodiment

A description is given of a fifth example embodiment of a light source unit employable for an image projection apparatus such as a projector. In a light source unit 1d of the fifth example embodiment, a cross section area of light beam flux exiting from the light source unit 1d is reduced to shorten a light focus distance of the exiting light beam flux, with which a projector including the light source unit 1d can be compact in size in a light exiting direction of the light source unit.

Figure 12:
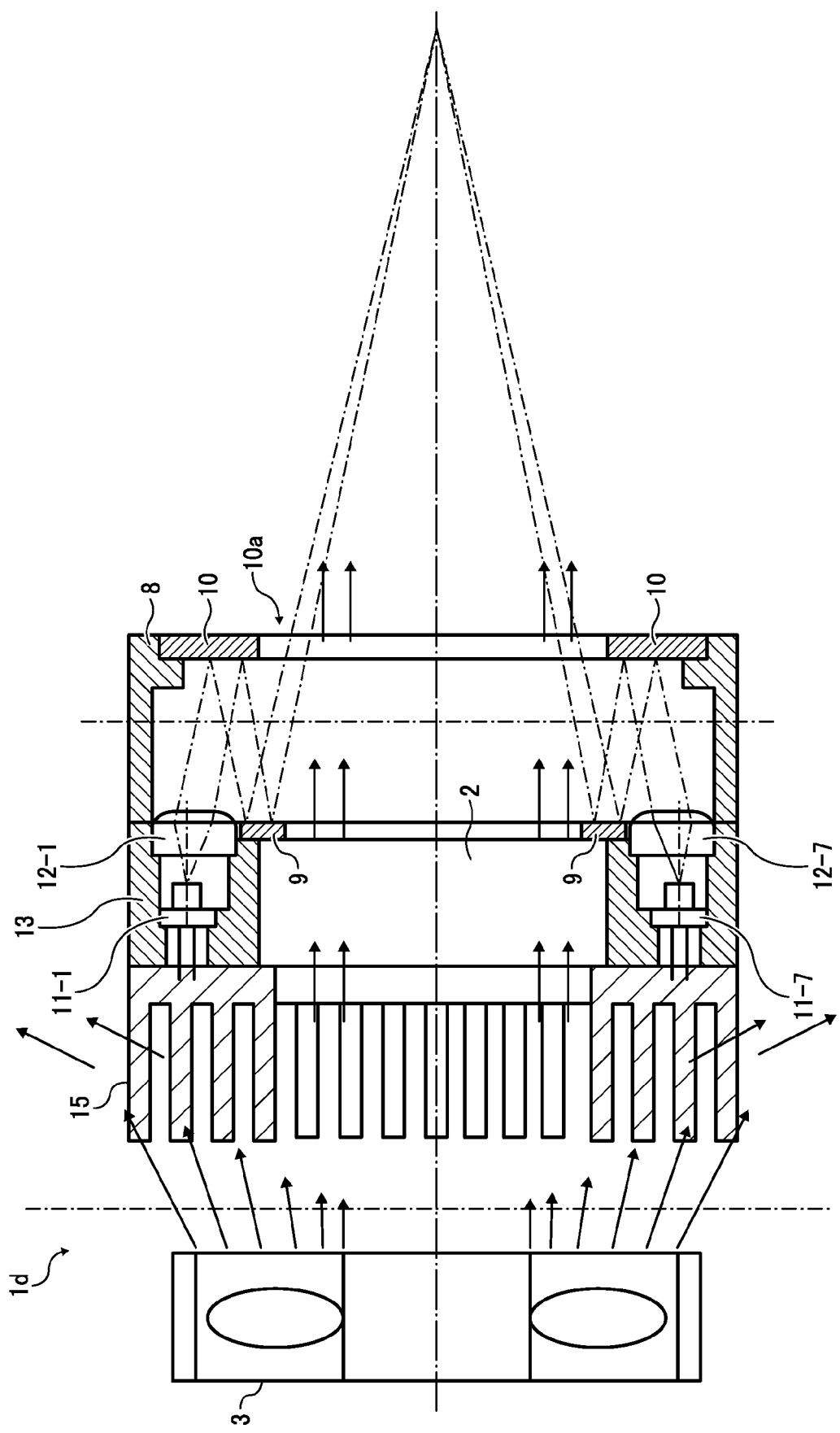
FIG. 12 is a schematic cross-sectional view of a light source unit according to a fifth example embodiment.

FIG. 12 is a schematic cross-sectional view of a light source unit 1d of the fifth example embodiment. Similar to the previous example embodiments, in the light source unit 1d of the fifth example embodiment, a plurality of the light sources 11-1 to 11-12 (12 light sources in the fifth example embodiment) and a plurality of the coupling lenses 12-1 to 12-12 are supported and arranged in a circle pattern two dimensionally on the light source supporter 13.

Further, similar to the previous example embodiments, the light source supporter 13 is formed with the ventilating hole 2 having a circle shape at an inner portion of the light sources 11-1 to 11-12 arranged in the circle pattern two dimensionally.

Further, similar to the third example embodiment and fourth example embodiment, the heat sink 15 is disposed at the rear face of the light source supporter 13. The heat sink 15 is formed with the through hole 15c communicating to the ventilating hole 2 of the light source supporter 13, with which cooling air coming from the axial flow fan 3 can pass through the ventilating hole 2 via the through hole 15c.

The light source unit 1d of the fifth example embodiment includes a first reflection mirror 9 used as a first light guide member at an inner portion of the light sources 11-1 to 11-12 arranged in the circle pattern. The first reflection mirror 9 is used to guide light entering the first reflection mirror 9 to the light exiting direction of the light source unit 1. Further, the light source unit 1d of the fifth example embodiment includes a second reflection mirror 10 used as a second light guide member to guide light emitted from the light sources 11-1 to 11-12 arranged in the circle pattern two dimensionally to the first reflection mirror 9. The light emitted from the light sources 11-1 to 11-12 reflects on the second reflection mirror 10 as a reflection light, and the reflection light enters the first reflection mirror 9. The reflection light entering the first reflection mirror 9 reflects on the first reflection mirror 9, and then exits from the light source unit 1d.

The first reflection mirror 9 is, for example, a ring plate supported by a surface of the light source supporter 13 existing between the light sources 11-1 to 11-12 arranged in the circle pattern two dimensionally and the ventilating hole 2. As shown in FIG. 12, the first reflection mirror 9 can be disposed while the first reflection mirror 9 is protruded to the exit end of the ventilating hole 2 without causing too much flow disturbance to cooling air passing through the ventilating hole 2. The first reflection mirror 9 can be made of, for example, a ring glass plate, in which an aluminum layer is deposited on one face of the plate to form a reflection face used as a reflection portion.

The second reflection mirror 10 is, for example, is a ring plate supported by an edge of a unit side wall 8 provided to a surface of the light source supporter 13, wherein the unit side wall 8 encloses the light sources 11-1 to 11-12 arranged in a circle pattern two dimensionally. The second reflection mirror 10 is positioned at a position to reflect the light emitted from each of light sources 11-1 to 11-12 to the first reflection mirror 9 disposed at a position corresponding to the inner portion of the light sources 11-1 to 11-12 arranged in the circle pattern. The second reflection mirror 10 can be made of, for example, a ring glass plate, in which an aluminum layer is deposited on one face of the plate to form a reflection face used as a reflection portion.

The light emitted from the light sources 11-1 to 11-12 and passing through the coupling lenses 12-1 to 12-12 is reflected at the second reflection mirror 10, and then reflected by the first reflection mirror 9 disposed at the inner portion of the light sources 11-1 to 11-12 arranged in the circle pattern, and then the light exits from the light source unit 1d. By repeating this light reflection, the cross section area of the light flux emitted from the light sources 11-1 to 11-12 can be decreased gradually, with which density increased light flux can exit from the light source unit 1d. Further, by reducing the cross section area of the light flux exiting from the light source unit 1d, a light focus distance of the exiting light beam flux can be shortened, with which a projector including the light source unit 1d can be compact in size in the light exiting direction of the light source unit 1d.

In the fifth example embodiment, the number of reflection times of light at the second reflection mirror 10 is one time and the number of reflection times of light at the first reflection mirror 9 is one time, and then the light exits from the light source unit 1d in the light exiting direction. However, the number of reflection times of light at the second reflection mirror 10 can be set two times or more to reflect the light emitted from the light sources 11-1 to 11-12 to the first reflection mirror 9 by increasing the mirror members composing the second reflection mirror 10. The greater the number of reflection times of light, the smaller the cross section area of the light flux exiting from the light source unit 1d.

Further, a component of the second light guide member to reflect the light emitted from the light sources 11-1 to 11-12 to the first reflection mirror 9 is not limited to a mirror that reflects light to change a light path, but can be other light path changing member that refracts light to change a light path. Further, a component of the first light guide member to guide the light to the light exiting direction of the light source unit 1 is not limited to a mirror but can be other light path changing member that refracts light to change a light path.

Further, in the fifth example embodiment, the light source supporter 13 that supports the plurality of light sources 11-1 to 11-12 and the plurality of coupling lenses 12-1 to 12-12, and the unit side wall 8 that supports the second reflection mirror 10 can configure a casing of the light source unit 1, in which the light source supporter 13 and the unit side wall 8 can be collectively referred to as a light source casing. Typically, it is preferable that the light source casing has openings communicating with external environment as little as possible to prevent intrusion of foreign particles such as dust from air. Therefore, in usual cases, the exit port of light such as a circle hole 10a of the second reflection mirror 10 may be covered by a translucent member such as glass that can pass through light.

However, in the fifth example embodiment, the translucent member is not disposed at the circle hole 10a of the second reflection mirror 10 used as a light exit port of the light source unit 1, but the circle hole 10a of the second reflection mirror 10 is set as opening. With this configuration, the cooling air supplied from the rear side of the light source supporter 13 to the front side of the light source supporter 13 by passing through the ventilating hole 2 of the light source supporter 13 can be ejected outside the light source unit 1 from the circle hole 10a. If the translucent member is disposed at the circle hole 10a of the second reflection mirror 10, another opening or hole is required to be formed for the light source casing to eject the cooling air efficiently from the light source casing, in which rigidity of the light source casing decreases.

In the fifth example embodiment, an opening such as the circle hole 10a can be used as a light exit port 10a and an ejection port of cooling air, with which a greater cooling air ejection port can be secured without decreasing the rigidity of the light source casing. With this configuration, the cooling air can be ejected from the light source casing efficiently, with which cooling performance of cooling air can be maintained at a higher level. Further, in the fifth example embodiment, the circle hole 10a (useable as the light exit port 10a) of the second reflection mirror 10 is disposed at a position facing an exit of the ventilating hole 2. Therefore, decrease of flow rate of cooling air when the cooling air passes through the light source unit 1d becomes small, and therefore an enhanced cooling performance can be obtained.

Further, when the light exit port 10a (i.e., circle hole 10a) in the fifth example embodiment is used as the cooling air ejection port, a strong blow of cooling air from the inside to the outside of the light source casing occurs at the light exit port 10a. With this configuration, even if the light exit port 10a is the opening as above described, foreign particles such as dust may not intrude inside the light source casing easily, with which intrusion of foreign particles inside the light source casing may become little.

Sixth Example Embodiment

A description is given of a sixth example embodiment of a light source unit employable for an image projection apparatus such as a projector. A light source unit 1e of the sixth example embodiment has a configuration almost same as the light source unit of the above light source unit 1d of the fifth example embodiment, but compared to the light source unit 1d of the fifth example embodiment, a configuration of flow path of cooling air in the light source unit 1e of the sixth example embodiment is different. A description is given of a different point of the light source unit 1e of the sixth example embodiment compared to the light source unit 1d of the fifth example embodiment.

Figure 13:
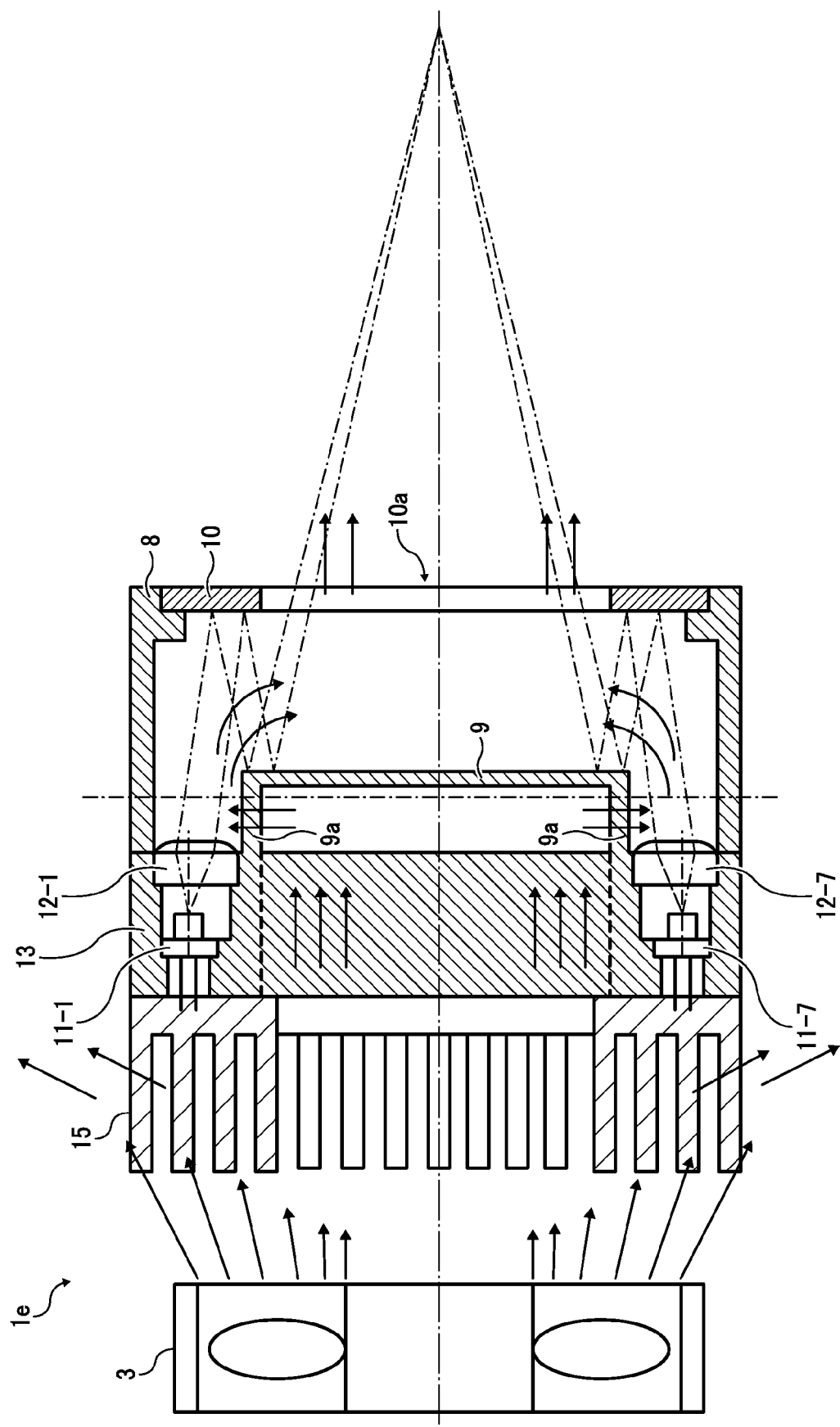
FIG. 13 is a schematic cross-sectional view of a light source unit according to a sixth example embodiment.

FIG. 13 is a schematic cross-sectional view of the light source unit 1e of the sixth example embodiment. As shown in FIG. 13, the first reflection mirror 9 is disposed at a position facing the ventilating hole 2 at the front side of the light source supporter 13 in the light source unit 1 of the sixth example embodiment. The first reflection mirror 9, having a disc-like shape, can have a function of flow guide to guide cooling air that has passed through the ventilating hole 2 to the light sources 11-1 to 11-12 and a function of the first light guide member.

In the sixth example embodiment, the rear side of the first reflection mirror 9, facing the ventilating hole 2 functions as the flow guide, and the front side of the first reflection mirror 9 functions as the first light guide member. The surface of the first reflection mirror 9 can be entirely finished as a reflection face, or only a part of the surface of the first reflection mirror 9 that receives a reflection light from the second reflection mirror 10 can be finished as a reflection face.

Similar to the flow plate 21 of the third example embodiment, the first reflection mirror 9 is substantially aligned with the ventilating hole 2, and has a diameter greater than a diameter of the ventilating hole 2. Further, as shown in FIG. 13, the first reflection mirror 9 is disposed at the front side of the light source supporter 13 via a plurality of spacers 9a (12 spacers in the sixth example embodiment).

In the sixth example embodiment, cooling air that has passed through the ventilating hole 2 hits the rear face of the first reflection mirror 9, facing the ventilating hole 2, and is then guided to the outer side of radius direction of the fan along the rear face of the first reflection mirror 9. With this configuration, cooling air that has passed through the ventilating hole 2 passes gaps between the spacers 9a, and flows on or over the light source supporter 13 while contacting the light sources 11-1 to 11-12 disposed at the front side of the light source supporter 13. With this configuration, cooling air that has passed through the ventilating hole 2 can pass through a space closer to the light sources 11-1 to 11-12, and preferably can hit the light sources 11-1 to 11-12 directly. Resultantly, heat can be efficiently taken from the light sources 11-1 to 11-12.

Further, in the sixth example embodiment, cooling air that has passed through the ventilating hole 2 and then near a space of the light sources 11-1 to 11-12 hits the inner wall of the unit side wall 8. Then, the cooling air hits the reflection face of the second reflection mirror 10, and then comes to the front side of the first reflection mirror 9, and then exits from the light source unit 1 though the light exit port 10a of the second reflection mirror 10 (i.e., inner portion of the second reflection mirror 10. With forming this cooling air flow path, cooling air is blown to the reflection face of the second reflection mirror 10, with which the second reflection mirror 10 can be cooled efficiently.

Most of the light emitted from the light sources 11-1 to 11-12 is reflected on the reflection face of the second reflection mirror 10, but a small part of the light is absorbed by the second reflection mirror 10 and the absorbed light becomes heat. Then, with an effect of gradually accumulated heat of the second reflection mirror 10, optical properties of the second reflection mirror 10 may change over the time due to heat effect and then causing distortion on the reflection face. In the sixth example embodiment, the second reflection mirror 10 can be cooled efficiently by cooling air, with which the change of optical properties of the second reflection mirror 10 due to heat effect can be suppressed.

(Image Projection Apparatus)

A description is given of an image projection apparatus such as a projector employing one or more of the above described example embodiments of light source units or apparatuses.

Figure 14:
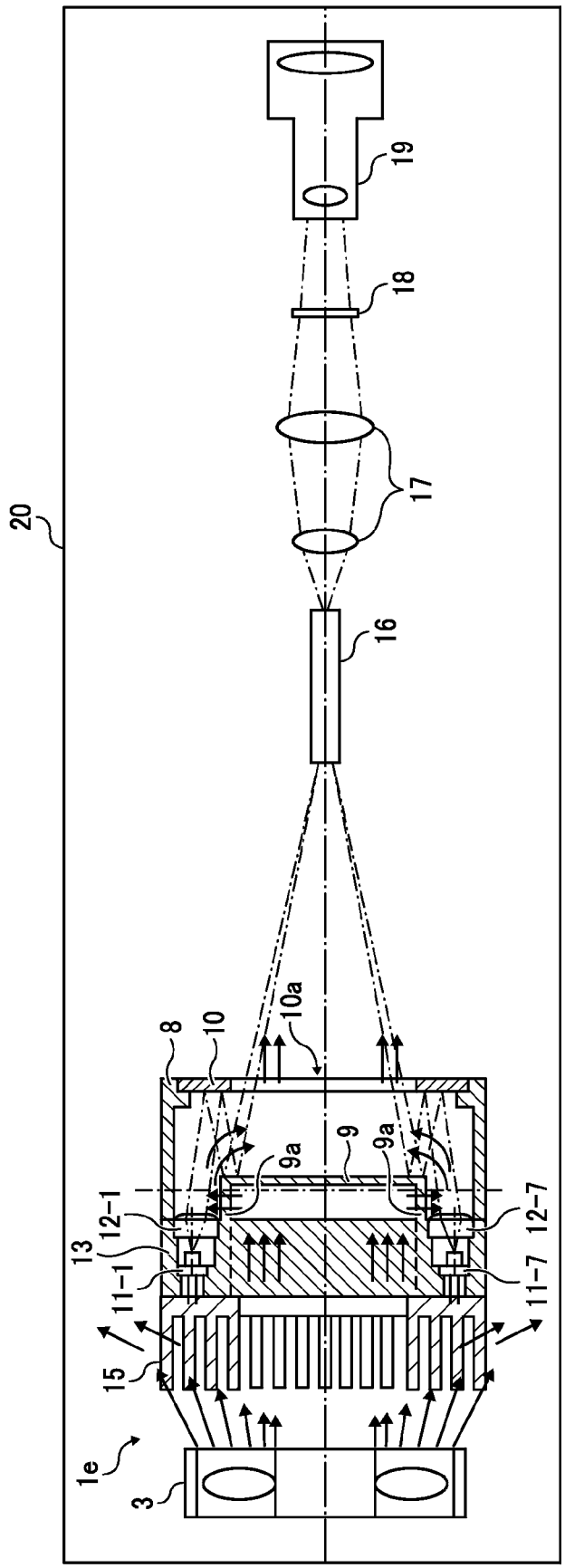
FIG. 14 is a schematic configuration of a projector according an example embodiment.

FIG. 14 is a schematic configuration of an image projection apparatus 20 using one of the above described example embodiments of light source units, in which, for example, the light source unit 1e is used. The image projection apparatus 20 includes, for example, the light source unit 1e, a rod integrator 16, a relay lens 17, an image generation panel 18 and a projection lens 19. The rod integrator 16, the relay lens 17 and the image generation panel 18 collectively configure a light-transmission optical system, and the projection lens 19 configures a projection optical system. The rod integrator 16 is used as a light quantity equalizing unit. The relay lens 17 is used as a light transmission optical system to transmit light, being equalized its light quantity by the rod integrator 16, to the image generation panel 18 used as an image generator. The projection lens 19 is used as the projection optical system to enlarge and project an image generated by the image generation panel 18.

The light beams emitted from the light sources 11-1 to 11-12 are condensed and then exit from the light source unit 1e as a light beam flux. Specifically, the light beam flux enters the rod integrator 16, which equalizes light quantity of light beams emitted from the light sources 11-1 to 11-12. The rod integrator 16 synthesizes color and equalizes the light quantity while the light beam flux repeats the total reflection in the rod integrator 16, and then the light exits from the rod integrator 16. The light exiting from the rod integrator 16 enters the relay lens 17, and then radiates the image generation panel 18. Then, an image is projected onto a screen using the projection lens 19.

In the image projection apparatus 20, the image generation panel 18 may be a pass-through type panel that generates images based on modulation signals, but other devices such as a reflection type panel or a micro-mirror device panel such as digital micro-mirror device (DMD) can be used. Further, the rod integrator 16 is an example of the light intensity equalizing unit, and other light intensity equalizing units can be used. Further, the relay lens 17 and the projection lens 19 are not limited examples of the above example embodiment.

By employing the above described light source units, described in the above described example embodiments, for the image projection apparatus 20, the light beams emitted from a plurality of light sources can be synthesized as the light beam flux having high light intensity and reduced its cross-section area, and the incidence angle to the rod integrator 16 can become smaller. Therefore, an area of the light radiating on the image generation panel 18 can be reduced, by which the projection lens 19 having a smaller numerical aperture (NA), which means a greater F-number lens, can be used. Therefore, the projection lens 19 can be designed and manufactured easily, and imaging performance can be maintained at a good enough level easily. As such, the image projection apparatus 20 can use a plurality of light sources while enhancing the heat dissipation performance and the performance of equalizing the light intensity.

Further, by reducing the cross-section area of light beam flux exiting from the light source unit, the light focus distance of the exiting light beam flux can be shortened, with which the rod integrator 16 can be disposed further closer to the light source unit and the image projection apparatus 20 can be designed in compact in size in the light exiting direction of the light source unit.

In the above described example embodiments, the light sources 11-1 to 11-12 are arranged in the circle pattern two dimensionally, but the configuration is not limited hereto. For example, when the light sources are arranged two dimensionally with a dispersed pattern, the light sources can be arranged in a lattice pattern, a polygonal pattern, or the like. The light sources can be arranged with an even pitch between the light sources or can be arranged with an uneven pitch between the light sources.

The above described example embodiment of the light source unit may have following features.

In the above described one or more of light source units, light emitting elements such as the light sources 11-1 to 11-12 are disposed with a dispersed pattern in a two-dimensional direction on a light emitting element supporter such as the light source supporter 13, and light emitted from light emitting element assembly exits from the light source unit to another devices such as the rod integrator 16. In such light source unit, the light emitting element supporter such as the light source supporter 13 has the ventilating hole 2 at an inner portion of two dimensional direction of the light emitting element assembly (inner portion of light sources 11-1 to 11-12), and cooling air, supplied from a rear side of a light emitting side of the light emitting element assembly, passes through the ventilating hole 2 to the light emitting side of the light emitting element assembly.

When the light emitting element assembly includes light emitting elements arranged in a two dimensional direction as above, the inner side portion of the light emitting element supporter at the light emitting side of the light emitting element assembly corresponds to a portion surrounded by air warmed by the light emitting elements arranged around the inner side portion of the light emitting element supporter. Therefore, heat may accumulate and temperature may increase at the inner side portion of the light emitting element supporter. In any one of the above described light source units, the inner side portion of the light emitting element supporter can be cooled efficiently using cooling air not yet taken heat from the light emitting elements, with which cooling performance of the light emitting element assembly can be enhanced.

In the above described one or more of light source units, the flow guide such as the flow plate 21 is disposed at a position facing the ventilating hole 2 at the light emitting side of the light emitting element assembly, and the flow guide guides the cooling air that has passed through the ventilating hole 2 to the light emitting element assembly. With this configuration, cooling air that has passed through the ventilating hole 2 can take heat from the light emitting element assembly efficiently, with which cooling performance can be enhanced.

In the above described one or more of light source units, a heat dissipater such as the heat sink 15 is disposed with the light emitting element supporter at the rear side of the light emitting side of the light emitting element assembly to dissipate heat of the light emitting element assembly, and the heat dissipater has the through hole 15c communicable with the ventilating hole 2 of the light emitting element supporter. With this configuration, without interrupting a flow of cooling air passing the ventilating hole 2, cooling performance by the heat dissipater can be obtained.

In the above described one or more of light source units, an air supply unit such as the axial flow fan 3 is disposed at the rear side of the light emitting side of the light emitting element assembly to supply cooling air to the ventilating hole 2, and a part of cooling air supplied by the air supply unit is directed to the rear side of the light emitting side in the light emitting element supporter of the light emitting element assembly. With this configuration, by using one air supply unit, cooling air can be supplied to both of the rear side of the light emitting element supporter and the front side of the light emitting element supporter to cool the light emitting element supporter.

In the above described one or more of light source units, an air supply unit such as the axial flow fan 3 is disposed at the rear side of the light emitting side of the light emitting element assembly to supply cooling air to the ventilating hole 2, and a dust proof filter 5 is disposed at least one position of an air intake side of the air supply unit, an air discharge side of the air supply unit, and the ventilating hole 2. With this configuration, adhesion of foreign particles such as dust on optical parts in the light source unit can be suppressed, and deterioration of optical properties such as decrease of light quantity due to adhesion of foreign particles on the optical parts can be suppressed.

In the above described one or more of light source units, a light source casing composed for example with the light source supporter 13 and the unit side wall 8 encases the light emitting element supporter and the light emitting element assembly. The light exit port 10a is opened for the light source casing, from which light emitted from the light emitting element assembly exits, and the cooling air that has passed through the ventilating hole 2 is ejectable outside the light source casing through the light exit port 10a. With this configuration, without decreasing rigidity of the light source casing, a cooling air ejection port having a broader area can be secured, with which cooling air can be efficiently ejected from the light source casing, and cooling performance by the cooling air can be maintained at a higher level. Further, when the light exit port 10a (i.e., circle hole 10a) is used as the cooling air ejection port, a strong blow of cooling air from the inside to the outside of the light source casing occurs at the light exit port 10a. With this configuration, even if the light exit port 10a is the opening as above describe, foreign particles such as dust may not intrude inside the light source casing easily, with which intrusion of foreign particles inside the light source casing may become little.

In the above described one or more of light source units, a first light guide member such as the first reflection mirror 9 and a second light guide member such as the second reflection mirror 10 are disposed. The first light guide member is disposed at an inner portion of two dimensional direction of the light emitting element assembly, and the first light guide member guides light that has entered the first light guide member to a light exiting direction of the light source unit. The second light guide member is entered with light emitted from the light emitting element assembly, and the second light guide member reflects a light path of the light to the first light guide member. With this configuration, the cross section area of the light flux emitted from the light emitting element assembly can be decreased, and density increased light flux can exit from the light source unit. Further, by reducing the cross section area of the light flux exiting from the light source unit, a light focus distance of the exiting light beam flux can be shortened, with which a projector including the light source unit can be compact in size in the light exiting direction of the light source unit.

In the above described one or more of light source units, the first light guide member is disposed at a position facing the ventilating hole 2 at the light emitting side of the light emitting element assembly, and the first light guide member is useable as a flow guide to guide the cooling air that has passed through the ventilating hole 2 to the light emitting element assembly. With this configuration, without disposing a flow guide, which is other member of the first light guide member, heat can be efficiently taken from the light emitting element assembly by cooling air that has passed through the ventilating hole 2, and an enhanced cooling performance can be obtained.

In the above described one or more of light source units, a flow path of the cooling air is formed so that the cooling air, which has passed through the ventilating hole 2, hits the second light guide member. With this configuration, temperature increase of the second light guide member can be suppressed, and change of optical properties of the second light guide member due to heat can be suppressed.

An image projection apparatus such as the image projection apparatus 20 can use the above described one or more of light source units, with a light-transmission optical system to guide light emitted from the light source unit to an image generator, and a projection optical system to enlarge and project an image generated by the image generator. With this configuration, the effects of the above described image projection apparatus can be obtained.

In the above described one or more of light source units, cooling air can be supplied from the rear side of the light emitting element supporter to the light emitting side of light emitting element supporter of the light emitting element assembly through the ventilating hole disposed at an inner portion of two dimensional direction of the light emitting element assembly. With this configuration, cooling air that has not yet taken heat from the light sources can be directly supplied to the inner portion of the light emitting element supporter in the two-dimensional direction, with which the inner portion of the light emitting element supporter at the light emitting side of the light emitting element assembly in the two-dimensional direction can be cooled efficiently.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A light source unit, comprising:
a plurality of light emitting elements disposed with a dispersed pattern in a two-dimensional direction to form a light emitting element assembly, the light emitting element assembly being configured to emit light to a target;
a light emitting element supporter to support the plurality of light emitting elements of the light emitting element assembly,
wherein the light emitting element supporter includes a ventilating hole at an inner portion of the light emitting element assembly in the two-dimensional direction, the light emitting element supporter being configured to cause cooling air, supplied from a rear side of a light emitting side of the light emitting element assembly, to pass through the ventilating hole to the light emitting side of the light emitting element assembly;

a first light guide member; and a second light guide member,
wherein the first light guide member is disposed at an inner portion of two dimensional direction of the light emitting element assembly, the first light guide member being configured to guide light that has entered the first light guide member to a light exiting direction of the light source unit,
wherein the second light guide member receives light emitted from the light emitting element assembly, and the second light guide member reflects the received light the light to the first light guide member, and
wherein the first light guide member is disposed at a position facing the ventilating hole at the light emitting side of the light emitting element assembly, and the first light guide member is useable as a flow guide to guide the cooling air that has passed through the ventilating hole to the light emitting element assembly.

2. The light source unit of claim 1, further comprising:
a heat dissipater disposed with the light emitting element supporter at the rear side of the light emitting side of the light emitting element assembly to dissipate heat of the light emitting element assembly,
wherein the heat dissipater has a through hole communicable with the ventilating hole of the light emitting element supporter.

3. The light source unit of claim 1, further comprising:
an air supply unit disposed at the rear side of the light emitting side of the light emitting element assembly to supply cooling air to the ventilating hole,
wherein a part of cooling air supplied by the air supply unit is directed to the rear side of the light emitting side in the light emitting element supporter of the light emitting element assembly.

4. The light source unit of claim 1, further comprising:
an air supply unit disposed at the rear side of the light emitting side of the light emitting element assembly to supply cooling air to the ventilating hole, and
a dust proof filter disposed at least one position of an air intake side of the air supply unit, an air discharge side of the air supply unit, and the ventilating hole.

5. The light source unit of claim 1, further comprising:
a light source casing to encase the light emitting element supporter and the light emitting element assembly,
wherein the light source casing includes a light exit port, from which light emitted from the light emitting element assembly exits, wherein the cooling air that has passed through the ventilating hole is ejectable outside the light source casing through the light exit port.

6. A light source unit, comprising:
a plurality of light emitting elements disposed with a dispersed pattern in a two-dimensional direction to form a light emitting element assembly, the light emitting element assembly being configured to emit light to a target;
a light emitting element supporter to support the plurality of light emitting elements of the light emitting element assembly,
wherein the light emitting element supporter includes a ventilating hole at an inner portion of the light emitting element assembly in the two-dimensional direction, the light emitting element supporter being configured to cause cooling air, supplied from a rear side of a light emitting side of the light emitting element assembly, to pass through the ventilating hole to the light emitting side of the light emitting element assembly a first light guide member; and a second light guide member,
wherein the first light guide member is disposed at an inner portion of two dimensional direction of the light emitting element assembly, the first light guide member being configured to guide light that has entered the first light guide member to a light exiting direction of the light source unit, and
wherein the second light guide member is configured to receive light emitted from the light emitting element assembly, and the second light guide member is configured to reflect the received light to the first light guide member, the second light guide member being in a flow path of the cooling air, through which the cooling air, which has passed through the ventilating hole, hits the second light guide member.

7. An image projection apparatus, comprising:
the light source unit of claim 1;
a light-transmission optical system to guide light emitted from the light source unit to an image generator; and
a projection optical system to enlarge and project an image generated by the image generator.

8. A light source unit, comprising:
a plurality of light emitting elements disposed with a dispersed pattern in a two-dimensional direction to form a light emitting element assembly, the light emitting element assembly being configured to emit light to a target;
a light emitting element supporter to support the plurality of light emitting elements of the light emitting element assembly,
wherein the light emitting element supporter includes a ventilating hole at an inner portion of the light emitting element assembly in the two-dimensional direction, the light emitting element supporter being configured to cause cooling air, supplied from a rear side of a light emitting side of the light emitting element assembly, to pass through the ventilating hole to the light emitting side of the light emitting element assembly; and
a first light guide member disposed at an inner portion of two dimensional direction of the light emitting element assembly, the first light guide member being configured to guide light that has entered the first light guide member to a light exiting direction of the light source unit, the first light guide member being disposed at a position facing the ventilating hole at the light emitting side of the light emitting element assembly such that the first light guide member is useable as a flow guide to guide the cooling air that has passed through the ventilating hole to the light emitting element assembly.

\* \* \* \* \*